United States Patent
Chang

(10) Patent No.: US 6,721,771 B1
(45) Date of Patent: *Apr. 13, 2004

(54) METHOD FOR EFFICIENT MODULAR POLYNOMIAL DIVISION IN FINITE FIELDS F(2^M)

(75) Inventor: Sheueling Chang, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 478 days.

This patent is subject to a terminal disclaimer.

(21) Appl. No.: 09/649,356

(22) Filed: Aug. 28, 2000

(51) Int. Cl.⁷ .............................................. G06F 15/00
(52) U.S. Cl. ..................................................... 708/492
(58) Field of Search ..................... 708/492, 650–656; 380/28

(56) References Cited

U.S. PATENT DOCUMENTS

| | | | | |
|---|---|---|---|---|
| 5,185,711 A | * | 2/1993 | Hattori ........................ | 708/492 |
| 6,044,389 A | * | 3/2000 | Weng et al. ................. | 708/492 |
| 6,049,815 A | * | 4/2000 | Lambert et al. ............ | 708/492 |
| 6,178,436 B1 | * | 1/2001 | Blake et al. ................. | 708/492 |
| 6,263,081 B1 | * | 7/2001 | Miyaji et al. ................. | 380/28 |
| 6,396,926 B1 | * | 5/2002 | Takagi et al. ................. | 380/28 |
| 6,430,588 B1 | * | 8/2002 | Kobayashi et al. .......... | 708/492 |

OTHER PUBLICATIONS

Berlekamp, E. "Algebraic Coding Theory," Aegean Park Press, 1984, pp. 21–118.
Kaliski, B., The Montgomery Inverse and Its Applications, IEEE Trans. Comp., vol. 44, No. 8, Aug. 1995, pp. 1064–1065.
Koblitz, N., Elliptic Curve Cryptosystems, Mathematics of Computation, vol. 48, No. 177, Jan. 1987, pp. 203–209.
KOC, C. and ACAR, T. Montgomery Multiplication in $GF(2^k)$, Design, Codes and Cryptography, 14, 1998. Also presented at the 3rd Annual Workshop on Selected Areas in Cyrptography, Queen's University, Canada, Aug. 1996, pp. 57–69.
Lopez, J. and Dahab, R., Fast Multiplication on Elliptic Curves over $GF(2^m)$ without Precomputation, CHES '99 Proceedings, Springer–Verlag, Aug. 1999, pp. 316–327.
Montgomery, P. Modular Multiplication Without Trial Division, Mathematics of Computation, vol. 44, No. 170, Apr. 1985, pp. 519–521.

(List continued on next page.)

*Primary Examiner*—Kakali Chaki
*Assistant Examiner*—Chat C. Do
(74) *Attorney, Agent, or Firm*—Zagorin, O'Brien & Graham, LLP

(57) ABSTRACT

The present invention provides a method for performing an inversion and multiply in a single operation as a polynomial divide operation. As a result, the invention reduces the number of mathematical operations needed to perform point doubling and point addition operations. An elliptic curve cryptosystem using the present invention can be made to operate more efficiently using the present invention. An elliptic curve crypto-accelerator can be implemented using the present invention to dramatically enhance the performance of the elliptic curve cryptosystem. The invention uses five registers A, B, U, V, and M, to accomplish a polynomial divide operation. Four registers A, B, U, and V are initialized with values so that the registers maintain a number of invariant relationships. The registers store initial values $a(t)=x(t)$, $u(t)=y(t)$, $b(t)=prime(t)$, and $v(t)=0$. Here the polynomials in registers A, U, B, and V are denoted as $a(t)$, $u(t)$, $b(t)$, and $v(t)$, respectively. Register M stores the irreducible polynomial $prime(t)$. By applying a series of invariant operations to the registers, the register values are systematically reduced until registers A and B have a value of one. At that point, register U stores a value which represents $y(t)/x(t)$ mod $prime(t)$, solving the polynomial division.

25 Claims, 3 Drawing Sheets

OTHER PUBLICATIONS

Standards for Efficient Cryptography, SEC 2: Recommended Elliptic Curve Domain Parameters, Certicom Research, Sep. 20, 2000, pp. i–45.

Song, Leilei and Parhi, Keshab K., Low–Energy Digit–Serial/Parallel Finite Field Multipliers, Journal of VLSI Signal Processing 19, 1998, pp. 149–166.

Halbutogullari, A. and KOC, Cetin K., Mastrovito Multiplier for General Irreducible Polynomials, IEEE Transactions on Computers, vol. 49, No. 5, May 2000, pp. 503–518.

Gao, L. Shrivastava, S., Lee, H., Sobelman, G., A Compact Fast Variable Key Size Elliptic Curve Cryptosystem Coprocessor, Proceedings of the Seventh Annual IEEE Symposium on Field–Programmable Custom Computing Machines, 1998, pages –2.

Orlando, G., Paar, C., A High–Performance Reconfigurable Elliptic Curve Processor for $GF(2^m)$, In CHES '2000 Workshop on Cryptographic Hardware and Embedded Systems, Springer–Verlag, Lecture Notes in Computer Science 1965, pp. 41–56.

Hankerson, D., Hernandez, J.L., Menezes, A., Software Implementation of Elliptic Curve Cryptography over Binary Fields, In CHES '2000 Workshop on Cryptographic Hardware and Embedded Systems, Springer–Verlag, Lecture Notes in Computer Science 1965, pp. 1–24.

Woodbury, A.D., Bailey D.V., Paar, C., Elliptic Curve Cryptography on Smart Cards Without Coprocessors, The Fourth Smart Card Research and Advanced Applications (CARDIS2000) Conference, Bristol, UK., pp. 71–92.

Itoh, Toshiya and Tsujii, Shigeo, A Fast Algorithm for Computing Multiplicative Inverses in $GF(2^m)$ Using Normal Bases", Information and Computation vol. 78, No. 3, Sep. 1988, pp. 171–177.

Blake, I., Seroussi, G. and Smart, N., "Elliptic Curves in Cryptography", London Math. Society Lecture Note 265, Cambridge University Press, 1999.

* cited by examiner

METHOD FOR EFFICIENT MODULAR POLYNOMIAL DIVISION IN FINITE FIELDS F(2 M)

BACKGROUND OF THE INVENTION

1. Field of the Invention

The present invention relates to modular polynomial divisions.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

Computer systems are useful for performing mathematical operations (add, subtract, multiply, divide) on operands. Often the operands are polynomials. A polynomial is a mathematical expression of one or more algebraic terms each of which consists of a constant multiplied by one or more variables raised to a nonnegative integral power (e.g. $a+bx+cx^2$). The task of performing mathematical operations on polynomial operands is difficult in the sense that it is not simply a matter of multiplying or dividing two simple numbers. There are a number of schemes that provide methods for performing mathematical operations on polynomials. However, there are situations for which no suitable schemes have been provided.

One situation that requires the manipulation of polynomials is the encryption and decryption of data in a cryptosystem and digital signatures for verification of the sender. A cryptosystem is a system for sending a message from a sender to a receiver over a medium so that the message is "secure", that is, so that only the intended receiver can recover the message. A cryptosystem converts a message, referred to as "plaintext" into an encrypted format, known as "ciphertext." The encryption is accomplished by manipulating or transforming the message using a "cipher key" or keys. The receiver "decrypts" the message, that is, converts it from ciphertext to plaintext, by reversing the manipulation or transformation process using the cipher key or keys. So long as only the sender and receiver have knowledge of the cipher key, such an encrypted transmission is secure.

A digital signature is a bit-stream generated by a cryptosystem. It is attached to a message such that a receiver of the message can verify with the bit-stream and be assured that the message was indeed originated from the sender it claims to be. A "classical" cryptosystem is a cryptosystem in which the enciphering information can be used to determine the deciphering information. To provide security, a classical cryptosystem requires that the enciphering key be kept secret and provided to users of the system over secure channels. Secure channels, such as secret couriers, secure telephone transmission lines, or the like, are often impractical and expensive.

A system that eliminates the difficulties of exchanging a secure enciphering key is known as "public key encryption." By definition, a public key cryptosystem has the property that someone who knows only how to encipher a message cannot use the enciphering key to find the deciphering key without a prohibitively lengthy computation. An enciphering function is chosen so that once an enciphering key is known, the enciphering function is relatively easy to compute. However, the inverse of the encrypting transformation function is difficult, or computationally infeasible, to compute. Such a function is referred to as a "one way function" or as a "trap door function." In a public key cryptosystem, certain information relating to the keys is public. This information can be, and often is, published or transmitted in a non-secure manner. Also, certain information relating to the keys is private. This information may be distributed over a secure channel to protect its privacy, (or may be created by a local user to ensure privacy). Some of the cryptosystems that have been developed include the RSA system, the Massey-Omura system, and the El Gamal system.

Elliptic Curves

Another form of public key cryptosystem is referred to as an "elliptic curve" cryptosystem. An elliptic curve cryptosystem is based on points on an elliptic curve E defined over a finite field F. Elliptic curve cryptosystems rely for security on the difficulty in solving the discrete logarithm problem. An advantage of an elliptic curve cryptosystem is there is more flexibility in choosing an elliptic curve than in choosing a finite field. Nevertheless, elliptic curve cryptosystems have not been widely used in computer-based public key exchange systems due to their late discovery and the mathematical complexity involved. Elliptic curve cryptosystems are described in "A Course in Number Theory and Cryptography" (Koblitz, 1987, Springer-Verlag, N.Y.).

In practice an Elliptic Curve group over Fields $F(_2m)$ is formed by choosing a pair of a and b coefficients, which are elements within $F(_2m)$. The group consists of a finite set of points $P(x,y)$ which satisfy the elliptic curve equation $$y^2+xy=x^3+ax^2+b$$

together with a point at infinity, O. The coordinates of the point, x andy, are elements of $F(_2m)$ represented in m-bit strings. Since $F(_2m)$ operates on bit strings and the field has a characteristic 2, computers can perform arithmetic in this field very efficiently. The arithmetic in $F(_2m)$ can be defined in either a standard basis representation or optimal normal basis representation. This description uses the standard basis representations for purposes of discussion. All elliptic curve point coordinates are represented as polynomials with binary coefficients.

The Elliptic Curve Cryptosystem relies upon the difficulty of the Elliptic Curve Discrete Logarithm Problem (ECDLP) to provide its effectiveness as a cryptosystem. Using multiplicative notation, the problem can be described as: given points P and Q in the group, find a number k such that $P^K=Q$; where k is called the discrete logarithm of Q to the base P. Using additive notation, the problem becomes: given two points P and Q in the group, find a number k such that $kP=Q$.

In an Elliptic Curve Cryptosystem, the large integer k is kept private and is often referred to as the secret key. The point Q together with the base point P are made public and are referred to as the public key. The security of the system, thus, relies upon the difficulty of deriving the secret k, knowing the public points P and Q. The main factor that determines the security strength of such a system is the size of its underlying finite field. In a real cryptographic application, the underlying field is made so large that it is computationally infeasible to determine k in a straight forward way by computing all the multiples of P until Q is found.

The core of the elliptic curve geometric arithmetic is an operation called scalar multiplication which computes kP by adding together k copies of the point P. The scalar multiplication is performed through a combination of point-doubling and point-addition operations. The point-addition operation adds two distinct points together and the point-doubling operation adds two copies of a point together. To compute, for example, 11P=(2*(2*(2P)))+2P=P, it would take 3 point-doublings and 2 point-additions.

Point-doubling and point-addition calculations require special operations when dealing with polynomial operands. Algebraic schemes for accomplishing these operations are illustrated below in Table 1.

TABLE 1

| Point addition: R = P + Q | Point Doubling: R = 2P |
|---|---|
| $S = (y_P - y_Q)*(1/(x_P + x_Q))$ | $S = x_P + y_P*(1/x_P)$ |
| $x_R = s^2 + s + a + x_P + x_Q$ | $x_R = s^2 + s + a$ |
| $y_R = s*(x_P + x_R) + x_R + y_P$ | $y_R = x_P^2 + (s + 1)*x_R$ |
| If Q = −P, R = P + (−P) = O, infinity | If $x_P$ = O, then R = 2 P = O, infinity |

The two equations for S in the table are called the slope-equations. Computation of a slope equation requires one modular polynomial inversion (1/X mod M) where M is an irreducible polynomial and one modular polynomial multiplication (*Y mod M). Because the operands are polynomials, these operations are typically done back-to-back as two separate operations. There exist algorithms and solutions to calculate the modular inversion 1/X mod M and the modular multiplication *Y mod M. After the result of the modular inversion is calculated, the multiplication *Y mod M is performed. Of course, algebraically (1/X*Y) mod M is the same as Y/X mod M. However, there is currently no technique for calculating modular Y/X in one operation when the operands are polynomial functions. These two field operations, the inversion and the multiply, are expensive computationally because they require extensive CPU cycles for the manipulation of two large polynomials modular a large irreducible polynomial. Today, it is commonly accepted that a point-doubling and point-addition operation each requires one inversion, two multiplies, a square, and several additions. To date there are techniques to compute modular inversions, and techniques to trade expensive inversions for multiplies by performing the operations in projective coordinates. There have been no efficient hardware oriented techniques suggested to compute a modular division directly which can be used to perform point doubling and point addition operations.

SUMMARY OF THE INVENTION

The present invention provides a method for performing an inversion and multiply in a single operation as a polynomial divide operation. As a result, the invention reduces the number of mathematical operations needed to perform point doubling and point addition operations. An elliptic curve cryptosystem using the present invention can be made to operate more efficiently using the present invention. An elliptic curve crypto-accelerator can be implemented using the present invention to dramatically enhance the performance of the elliptic curve cryptosystem.

The invention uses five registers A, B, U, V, and M, to accomplish a polynomial divide operation. Four registers A, B, U, and V are initialized with values so that the registers maintain a number of invariant relationships. The registers store initial values a(t)=x(t), u(t)=y(t), b(t)=prime(t), and v(t)=0. Here the polynomials in registers A, U, B, and V are denoted as a(t), u(t), b(t), and v(t), respectively. Register M stores the irreducible polynomial prime(t). By applying a series of invariant operations to the registers, the register values are systematically reduced until registers A and B have a value of one. At that point, register U stores a value which represents y(t)/x(t) mod prime(t), solving the polynomial division.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

Figure 1:
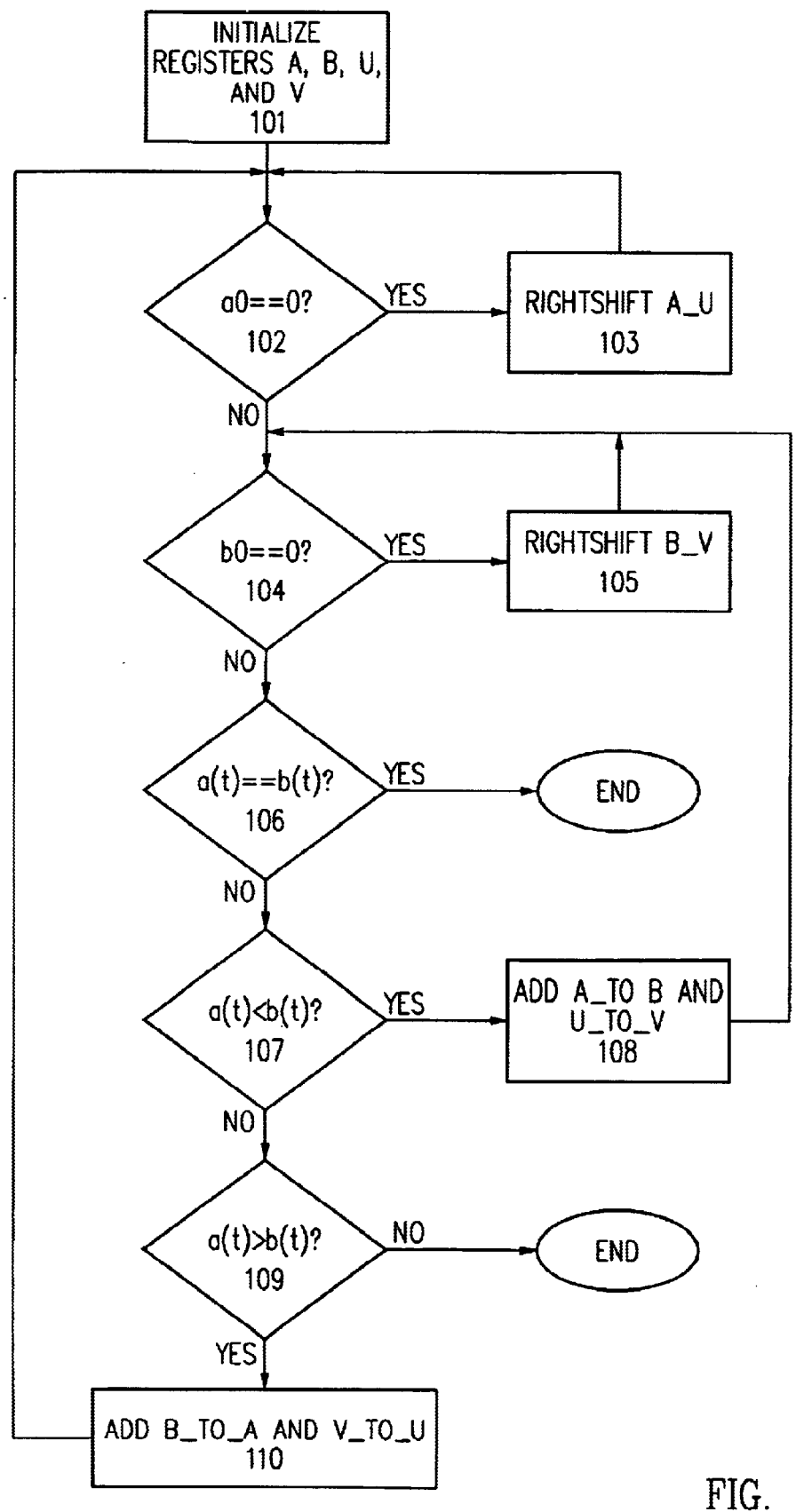
FIG. 1 is a flow diagram illustrating the operation of the present invention.

The invention is a method for efficient modular polynomial divisions. In the following description, numerous specific details are set forth to provide a more thorough description of the invention. It is apparent, however, to one skilled in the art, that the invention may be practiced without these specific details. In other instances, well known features have not been described in detail so as not to obscure the invention.

The invention provides a system for performing polynomial divides so that a polynomial inversion and multiply can be accomplished in one operation at the same computational cost as a polynomial inversion. The invention is described in connection with example operations from an elliptic curve cryptosystem.

Consider the division of two polynomials in the Fields $F(_2m)$. The invention combines a multiplication with an inversion process. Thus, the slope equation $s=x_p+y_p/x_p$ can be computed using one division operation at the cost of an inversion, and no multiplies:

| Point addition: | Point doubling: |
|---|---|
| $s = (y_P - y_Q)/(x_P + x_Q)$ | $s = x_P + y_P/x_P$ |

The invention computes the modular division of two polynomials y(t)/x(t) modulo prime(t).

Here, the function, y(t), is the numerator and the function, x(t), is the denominator, which are the two polynomial input functions to the polynomial-divide algorithm. The polynomial, prime(t), is the irreducible polynomial of the field.

The invention is implemented in a computer system by using five registers, A, B, U, V, and M. The fifth register M that holds the irreducible polynomial prime(t) is not shown here.

| register A | register U |
|---|---|
| register B | register V |

A bit-string in a register corresponds to a polynomial. For example, a bit-string of (1011000101) in register B indicates that $b(t)=t^9+t^7+t^6+t^2+1$. The big-string representation and the polynomial representation are inter-changeable. The invention uses a(t), b(t), u(t), and v(t) to refer to the polynomials in the A, B, U, and V registers, respectively.

The four registers are initialized with the values:

a(t)=x(t), u(t)=y(t), b(t)=prime(t), and v(t)=0, such that the polynomials in the registers satisfy the following invariant relationships:

$$a(t)*y(t)=u(t)*x(t) \bmod \text{prime}(t) \quad (1)$$

$$b(t)*y(t)=v(t)*x(t) \bmod \text{prime}(t) \quad (2)$$

One should note that b(t) is congruent to zero modular the prime polynomial.

Throughout the division process, the invention monolithically and iteratively reduces the contents in register A and B down to one by applying a combination of the following 4 invariant operations which guarantee the invariant relationship (1) and (2) throughout the entire process:

Operation 1: Right-shift-Register-A-and-U:
  a(t)=a(t)>>1;
  If (u0==1) u(t)=u(t)+prime(t);
  u(t)=u(t)>>1;

Operation 2: Right-shift-Register-B-and-V:
  b(t)=b(t)>>1;
  If (v0==1) v(t)=v(t)+prime(t);
  v(t)=v(t)>>1;

Operation 3: Add-Register-A-to-B-and-U-to-V:
  If (b0==1): b(t)=b(t)+a(t) and v(t)=v(t)+u(t)

Operation 4: Add-Register-B-to-A-and-V-to-U:
  If (a0==1): a (t)=a(t)+b(t) and u(t)=u(t)+v(t);

The notations a0, b0, u0, and v0 indicate the least-significant-bit of each register, respectively.

The goal is to reduce registers A and B to values of one. This is accomplished by applying the four above operations when possible using the following rules.

Rule #1: Apply Operation 1 whenever the least significant bit of Register A is zero, i.e. a=0, to reduce the polynomial a(t);

Rule #2: Apply Operation 2 whenever the least significant bit of Register B is zero, i.e. b0=0, to reduce the polynomial b(t);

Rule #3: When both least significant bits a0=1 and b0=1, and a(t)<b(t), Operation 3 is applied.

When both least significant bits a0=1 and b0=1, and a(t)>b(t), Operation 4 is applied.

Rule #4: If a(t)=b(t), the division process is completed.

Operation 3 or 4 are used to zero the least significant bit of A or B such that Operation 1 or 2 can be repeated. To ensure a monolithic reduction of a(t) and b(t), only a smaller polynomial can be added to a larger one.

A right-shift operation on a bit-string in the register is equivalent to dividing the polynomial by t. For instance, a bit-string (11000100) represents a polynomial function $f(t)=t^7+t^6+t^2$. A right-shift operation produces a bit-string (01100010) which corresponds to the polynomial function $f(t)=(t^7+t^6+t^2)/t=t^6+t^5+t$. The operations 3 and 4 also obey the two invariant relationships. If A, U, B and V satisfy the relationships prior to the operation:

$$a(t)*y(t)=u(t)*x(t) \bmod \text{prime}(t)$$

$$b(t)*y(t)=v(t)*x(t) \bmod \text{prime}(t)$$

the equation b'(t)*y(t)=v'(t)*x(t) mod prime(t) will still be true after adding register A to B and register U to V, because $$(b'(t)=b(t)+a(t))*y(t)=v'(t)=v(t)+u(t))*x(t) \bmod \text{prime}(t)$$

$$a'(t)*y(t)=u'(t)*x(t) \bmod \text{prime}(t)$$

This process repeats itself until both A and B are one. At the end of the iteration process, the division is completed and the resulting polynomial is in the U register:

$$u(t)=y(t)/x(t) \bmod \text{prime}(t)$$

Since a(t)=b(t)=1 and a(t)*y(t)=u(t)*x(t) mod prime(t), we know that the bit-string in register U represents the result of the polynomial division. Thus, the polynomial division has been accomplished without two separate operations, an inversion followed by a multiplication.

This present invention can be implemented as an iterative process. The following example uses C-syntax pseudo-code, although the present invention can be implemented in any programming language. The pseudo-code below uses the four invariant operations defined previously, as follows:

```
Initialize registers A-U-B-and-V;
while (a0==0) Right-shift-registers-A-and-U;
while ( a(t) !=b(t) ){
    if ( a(t)<b(t) ) {
        Add-register-A-to-B-and-U-to-V ;
        while (b0 ==0 ) Right-shift-register-B-and-V ;
    } else if ( a(t) > b(t) ) {
        Add-register-B-to-A-and-V-to-U ;
        while ( a0 ==0 ) Right-shift-register-A-and-V;
    }
}
```

This process is illustrated in FIG. 1. At step 101 registers A, B, U, and V are initialized with values a(t)=x(t), u(t)=y(t), b(t)=prime(t), and v(t)=0 such that the invariant relationships described above are satisfied. At step 102 the least significant bit of the value in register A is examined to determine if it is zero. If so, then a rightshift operation according to invariant operation 1 is performed on the register value at step 103. The system then returns to step 102.

If not, then the system proceeds to step 104 to determine if the LSB of register B is equal to zero. If yes, then a rightshift operation according to invariant operation 2 is performed at step 105 and the system returns to step 104. If not, the system proceeds to step 106.

At step 106 it is determined if the values of registers A and B are equal. If so, the operation ends. If not, it is determined at step 107 if the value of register A is less than B, then operation 3 is applied at step 108 and the system returns to step 104. If not, step 109 determines if the value of register A is greater than the value of register B. If not, the operation ends. If so, the system performs operation 4 at step 110 and returns to step 102.

An example of the efficiency gain is demonstrated by applying the invention to a scalar multiplication example. For example, assume Q=kP. Assume the scalar k is a 160-bit large integer:

$$k=(100 \ldots \ldots 01110 \ldots \ldots 01010 \ldots \ldots 001101)=((1*2^{49}+7)*2^{66}+5)*2^{44}+13$$

The invention first breaks up the binary bit-string of the scalar k into two kinds of windows, nonzero-windows and the zero-windows:

$$k=(1 \; 00 \ldots \ldots 0 \; 111 \; 0 \ldots \ldots 0 \; 101 \; 0 \ldots \ldots 00 \; 1101)$$

The scalar multiplication can be decomposed into multiple iterations of repeated point-doublings and point-additions:

$$Q = kP = ((2^{49} * P + 7P) * 2^{66} + 5P) * 2^{44} + 13P$$
$$= 2^{44} Q_1 + 13P, \text{ where}$$
$$Q_1 = 2^{66} Q_2 + 5P \text{ and } Q_2 = 2^{49} P + 7P$$

The size of a zero-window can be as large as it needs to be. The size of a nonzero-window is limited by the size of the look-up table used in the system. The points, 7P, 5P, and 13P can be fetched directly from a look-up table. A table look-up is an effective technique for eliminating point-additions. Using a small 4-bit look-up table, one can potentially eliminate up to 75% of the point-additions in the system. Now the computation burden shifts over to the side of point-doublings. As can be seen from the table below, 159 point doublings result from $2^{49}$ P, $2^{44}$ $Q_1$, and $2^{66}$ $Q_2$ and consume significant computational resources.

Thus, the scalar multiplication above requires 159 point-doublings and 3 point-additions. Using prior art techniques, this would require as many as 324 multiplies. Using the present invention, the total number of multiplies in this scalar multiplication is reduced to 6.

|  | Conventional approach | New approach |
|---|---|---|
| 159 point-doublings | 318 multiplies + 159 inverts | 3 multiplies + 159 inverts |
| 3 point-additions | 6 multiplies + 3 inverts | 3 multiplies + 3 inverts |
| Total | 324 multiplies + 162 inverts | 6 multiplies + 162 inverts |

Hardware Execution Environment

Figure 2:
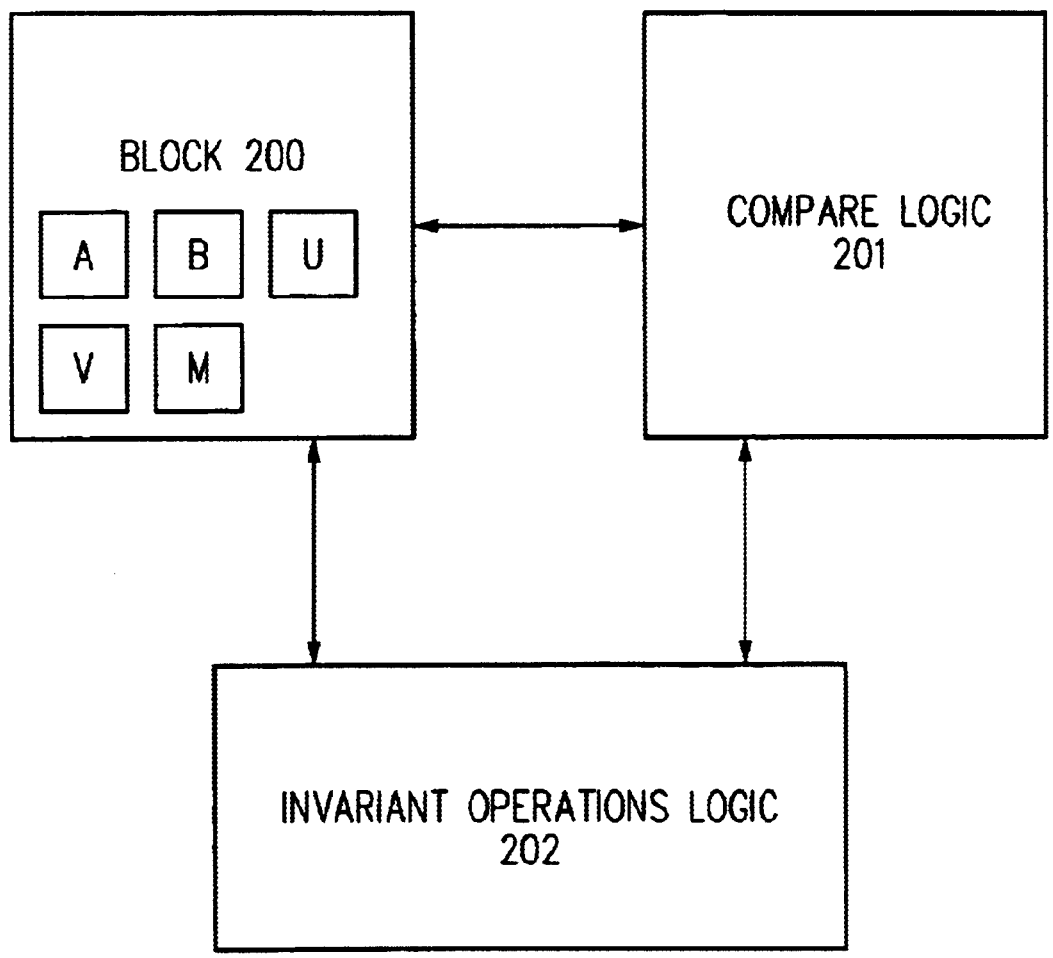
FIG. 2 is a flow diagram illustrating an iterative implementation of the present invention.

The present invention can be implemented as an elliptic curve crypto-accelerator in hardware. One possible embodiment is illustrated in FIG. 2. Block 200 contains the five registers A, B, U, V, and M. Compare logic 201 is coupled to the registers and is used to compare the LSB's of registers A and B, to compare the values of registers A and B, and to execute the algorithm described in FIG. 1. Invariant operations logic 202 is coupled to the registers 200 and to the compare logic 201 to implement the four invariant operations as appropriate.

Software Execution Environment

Figure 3:
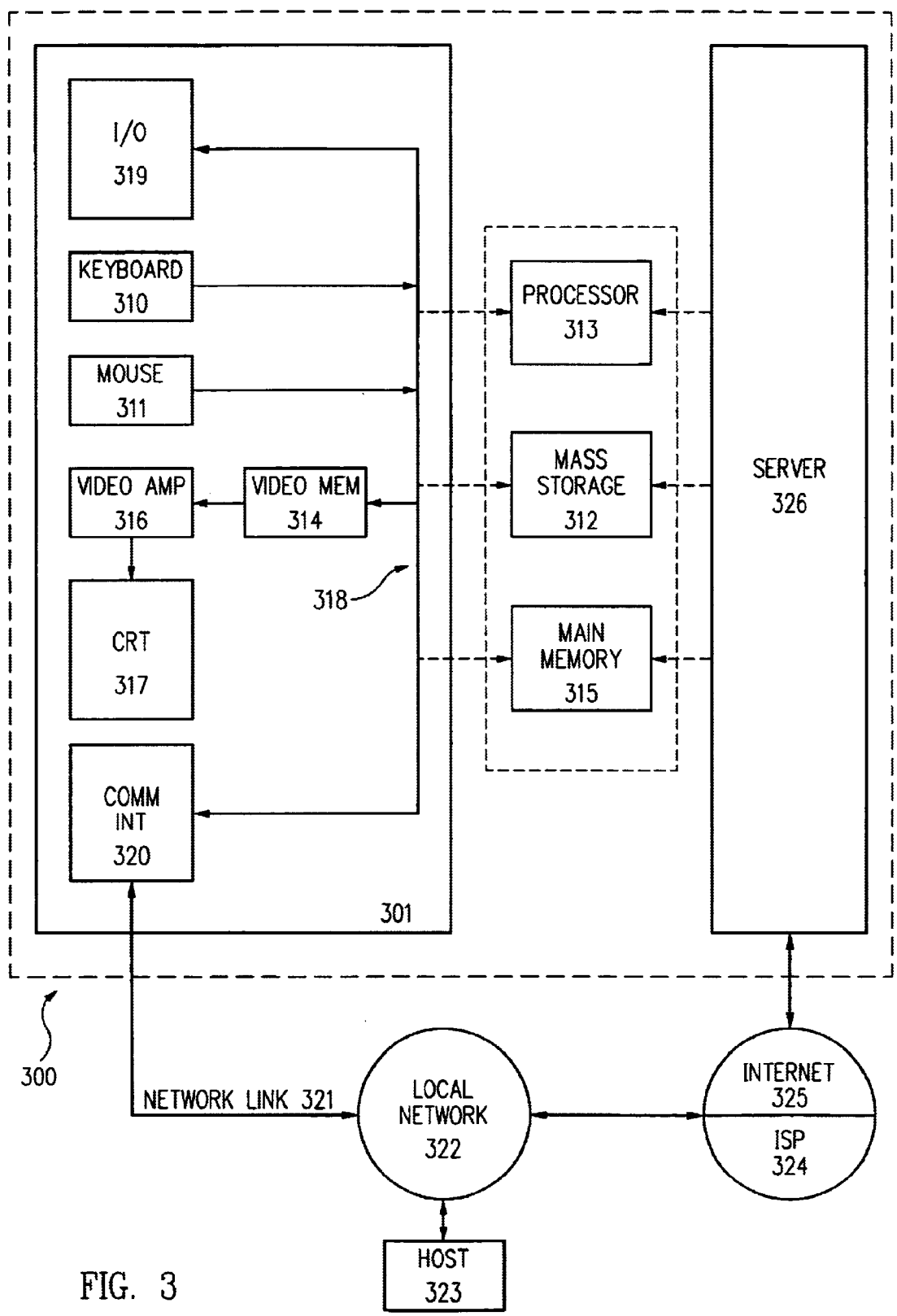
FIG. 3 illustrates an execution environment of the present invention.

An embodiment of the invention can be implemented as computer software in the form of computer readable code executed in a general purpose computing environment such as environment 300 illustrated in FIG. 3, or in the form of bytecode class files running in such an environment. A keyboard 310 and mouse 311 are coupled to a bi-directional system bus 318. The keyboard and mouse are for introducing user input to a computer 301 and communicating that user input to processor 313.

Computer 301 may also include a communication interface 320 coupled to bus 318. Communication interface 320 provides a two-way data communication coupling via a network link 321 to a local network 322. For example, if communication interface 320 is an integrated services digital network (ISDN) card or a modem, communication interface 320 provides a data communication connection to the corresponding type of telephone line, which comprises part of network link 321. If communication interface 320 is a local area network (LAN) card, communication interface 320 provides a data communication connection via network link 321 to a compatible LAN. Wireless links are also possible. In any such implementation, communication interface 320 sends and receives electrical, electromagnetic or optical signals which carry digital data streams representing various types of information.

Network link 321 typically provides data communication through one or more networks to other data devices. For example, network link 321 may provide a connection through local network 322 to local server computer 323 or to data equipment operated by ISP 324. ISP 324 in turn provides data communication services through the world wide packet data communication network now commonly referred to as the "Internet" 325. Local network 322 and Internet 325 both use electrical, electromagnetic or optical signals which carry digital data streams. The signals through the various networks and the signals on network link 321 and through communication interface 320, which carry the digital data to and from computer 300, are exemplary forms of carrier waves transporting the information.

Processor 313 may reside wholly on client computer 301 or wholly on server 326 or processor 313 may have its computational power distributed between computer 301 and server 326. In the case where processor 313 resides wholly on server 326, the results of the computations performed by processor 313 are transmitted to computer 301 via Internet 325, Internet Service Provider (ISP) 324, local network 322 and communication interface 320. In this way, computer 301 is able to display the results of the computation to a user in the form of output. Other suitable input devices may be used in addition to, or in place of, the mouse 311 and keyboard 310. I/O (input/output) unit 319 coupled to bi-directional system bus 318 represents such I/O elements as a printer, A/V (audio/video) I/O, etc.

Computer 301 includes a video memory 314, main memory 315 and mass storage 312, all coupled to bi-directional system bus 318 along with keyboard 310, mouse 311 and processor 313.

As with processor 313, in various computing environments, main memory 315 and mass storage 312, can reside wholly on server 326 or computer 301, or they may be distributed between the two. Examples of systems where processor 313, main memory 315, and mass storage 312 are distributed between computer 301 and server 326 include the thin-client computing architecture developed by Sun Microsystems, Inc., the palm pilot computing device, Internet ready cellular phones, and other Internet computing devices.

The mass storage 312 may include both fixed and removable media, such as magnetic, optical or magnetic optical storage systems or any other available mass storage technology. Bus 318 may contain, for example, thirty-two address lines for addressing video memory 314 or main memory 315. The system bus 318 also includes, for example, a 32-bit data bus for transferring data between and among the components, such as processor 313, main memory 315, video memory 314 and mass storage 312. Alternatively, multiplex data/address lines may be used instead of separate data and address lines.

In one embodiment of the invention, the processor 313 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 315 is comprised of dynamic random access memory (DRAM). Video memory 314 is a dual-ported video random access memory. One port of the video memory 314 is coupled to video amplifier 316. The video amplifier 316 is used to drive the cathode ray tube (CRT) raster monitor 317. Video amplifier 316 is well known in the art and may be implemented by any suitable apparatus. This circuitry converts pixel data stored in video memory 314 to a raster signal suitable for use by monitor 317. Monitor 317 is a type of monitor suitable for displaying graphic images.

Computer 301 can send messages and receive data, including program code, through the network(s), network link 321, and communication interface 320. In the Internet example, remote server computer 326 might transmit a requested code for an application program through Internet 325, ISP 324, local network 322 and communication interface 320. The received code may be executed by processor 313 as it is received, and/or stored in mass storage 312, or other non-volatile storage for later execution. In this manner, computer 300 may obtain application code in the form of a carrier wave. Alternatively, remote server computer 326 may execute applications using processor 313, and utilize mass storage 312, and/or video memory 315. The results of the execution at server 326 are then transmitted through Internet 325, ISP 324, local network 322 and communication interface 320. In this example, computer 301 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a method for efficient polynomial divide has been described.

What is claimed is:

1. A method for use in a cryptographic system, the method of comprising:
   initializing a register A with a value a(t)=x(t), wherein x(t) is a first binary polynomial that represents a first element of a prime field of order $2^m$;
   initializing a register U with a value u(t)=y(t), wherein y(t) is a second binary polynomial that represents a second element of the prime field;
   initializing a register B with a value b(t)=prime(t), wherein prime(t) is an irreducible polynomial of order m and is of the prime field;
   initializing a register V with a value v(t)=0;
   iteratively reducing the contents of registers A and B to a value of one by applying a plurality of invariant operations to registers A, B, U, and V until register U contains a value equal to (y(t)/x(t)) mod prime(t) when the values in registers A and B equal one; and
   generating one or more security values based at least in part on register U's value, wherein the security values are used in the cryptographic system.

2. The method of claim 1 wherein the initial values in the registers satisfy two invariant relationships, the two invariant relationships comprising:

$$a(t)*y(t)=u(t)*x(t) \bmod \text{prime}(t) \ldots (1)$$

$$b(t)*v(t)=*x(t) \bmod \text{prime}(t) \ldots (2).$$

3. The method of claim 2 wherein values in said registers maintain said invariant relationships after application of any of the plurality of invariant operations.

4. The method of claim 1, wherein the plurality of invariant operations comprise:
   storing in register A a quotient of register A's contents and t if register A's contents are even;
   storing in register U a quotient of register U's contents and t if both register U's contents and register A's contents are even;
   storing in register U a quotient of t and a sum of prime(t) and register U's contents if register A's contents are even and register U's contents are not even;
   storing in register B a quotient of register B's contents and t if register B's contents are even;
   storing in register V a quotient of register V's contents and t if both register V's contents and register B's contents are even;
   storing in register V a quotient of t and a sum of prime(t) and register V's contents if register B's contents are even and register V's contents are not even;
   storing in register A a quotient of t and a sum of register B's contents and register A's contents, storing in register U a sum of register V's contents and register U's contents, if register A's contents are greater than register B's contents;
   storing in register U a quotient of register U's contents and t if register U's contents are even and register A's contents are greater than register B's contents;
   storing in register U a quotient of t and a sum of prime(t) and register U's contents if register U's content are not even and register A's contents are greater than register B's contents; and
   storing in register B a quotient of t and a sum of register B's contents and register A's contents and storing in register V a sum of register V's contents and register U's contents, if register A's contents are not greater than register B's contents and neither register A's contents nor register B's contents are even;
   storing in register V a quotient of t and register V's contents if register V's contents are even and register A's contents are not greater than register B's contents and neither register A's contents nor register B's contents are even; and
   storing in register V a quotient of t and a sum of prime(t) and register V's contents if register V's contents are not even and register A's contents are not greater than register B's contents and neither register A's contents nor register B's contents are even.

5. The method of claim 4 wherein a quotient is determined with one or more shifts.

6. The method of claim 4 wherein a register's contents are even if its least significant bit is zero.

7. The method of claim 1, wherein the cryptographic system is based on elliptic curve cryptography.

8. The method of claim 1 wherein the security values includes security keys.

9. The method of claim 1 wherein the security values are used in the cryptographic system for encryption/decryption.

10. A method for securing data, the method comprising:
    selecting a first point on an elliptic curve of a Galois field of an order $2^m$;

calculating (x(t)/y(t)) mod M(t), wherein x(t) is a first polynomial, y(t) is a second polynomial, and M(t) is an irreducible polynomial, the first and second polynomials represent elements of the Galois field and the irreducible polynomial is of the Galois field and of degree m, wherein the calculating includes, assigning the first polynomial to a first register A and the second polynomial to a second register U, assigning an irreducible polynomial M(t) to a third register B, initializing a fourth register V with zero, and iteratively reducing the registers A and B to one while adjusting the values U and V to maintain the following two invariant relationships:

$$A*y(t) \equiv U*x(t) \bmod M(t) \quad (1)$$

$$B*y(t) \equiv V*x(t) \bmod M(t) \quad (2); \text{ and}$$

selecting a second point on the elliptic curve based at least in part on register U's value; and securing data based at least in part on the selected first and second points on the elliptic curve.

11. The method of claim 10 wherein securing data includes generating one or more security keys based at least in part on the selected first and second points.

12. The method of claim 11 further comprising selecting a multiplier and generating the security keys based at least in part on the selected first and second points and the selected multiplier.

13. The method of claim 10 wherein securing the data includes encryption and decryption of the data.

14. The method of claim 10 wherein the polynomials are represented as bit strings.

15. The method of claim 10 wherein iteratively reducing the registers A and B comprises:

storing in register A a quotient of register A's contents and t if register A's contents are even;

storing in register U a quotient of register U's contents and i if both register U's contents and register A's contents are even;

storing in register U a quotient of t and a sum of prime(t) and register U's contents if register A's contents are even and register U's contents are not even;

storing in register B a quotient of register B's contents and t if register B's contents are even;

storing in register V a quotient of register V's contents and t if both register V's contents and register B's contents are even;

storing in register V a quotient of t and a sum of prime(t) and register V's contents if register B's contents are even and register V's contents are not even;

storing in register A a quotient of t and a sum of register B's contents and register A's contents, storing in register U a sum of register V's contents and register U's contents, if register A's contents are greater than register B's contents;

storing in register U a quotient of register U's contents and t if register U's contents are even and register A's contents are greater than register B's contents;

storing in register U a quotient of t and a sum of prime(t) and register U's contents if register U's content are not even and register A's contents are greater than register B's contents; and storing in register B a quotient of t and a sum of register B's contents and register A's contents and storing in register V a sum of register V's contents and register U's contents, if register A's contents are not greater than register B's contents and neither register A's contents nor register B's contents are even;

storing in register V a quotient of t and register V's contents if register V's contents are even and register A's contents are not greater than register B's contents and neither register A's contents nor register B's contents are even; and storing in register V a quotient of t and a sum of prime(t) and register V's contents if register V's contents are not even and register A's contents are not greater than register B's contents and neither register A's contents nor register B's contents are even.

16. The method of claim 15 wherein a register's contents are even if its least significant bit is zero.

17. The method of claim 15 wherein a quotient is determined with one or more shifts.

18. The method of claim 10 wherein the cryptographic system is based at least in part on elliptic curve cryptography.

19. A computer program product encoded on one or more machine-readable media to implement the method of claim 10.

20. An apparatus comprising:
a first register to initially host a first binary polynomial;
a second register to initially host a second binary polynomial, wherein the first and second binary polynomials represent elements of a Galois field of order $2^m$;
a third register to initially host an irreducible polynomial of the degree m and of the Galois field;
a fourth register to initially host a zero;
a compare logic to determine if the first register's value is even, if the third register's value is even, or if the first register's value is greater than the third register's value; and an invariant operations logic for modifying the first, second, third, and fourth register to conform to invariant relationships including,
a product of the first register and the second binary polynomial being congruent to a product of the second register and first binary polynomial modulo the irreducible polynomial, and
a product of the third register and the second binary polynomial being congruent to a product of the fourth register and the first binary polynomial modulo the irreducible polynomial.

21. A crypto-accelerator including the apparatus of claim 20.

22. The apparatus of claim 20 further comprising a look-up table to host one or more results of point additions or point doublings.

23. An apparatus comprising:
a set of registers to initially host a first and second binary polynomial, irreducible polynomial, and a zero; and
a means for generating one or more security values for securing data, the security values being based at least in part on a residue determined by iteratively reducing a subset of the set of registers that host the first binary polynomial and the irreducible polynomial until a residue of the quotient of the first and second binary polynomial with respect to the irreducible polynomial is hosted in one or more of the set of registers, wherein the polynomials and the residue are of a prime field that corresponds to an elliptic curve.

24. The apparatus of claim 23 further comprising a means to look-up predefined results of point doublings or point additions.

25. The apparatus of claim 23 wherein the order of the prime field is $2^m$ and the degree of the irreducible polynomial is m.

* * * * *

UNITED STATES PATENT AND TRADEMARK OFFICE
CERTIFICATE OF CORRECTION

PATENT NO. : 6,721,771 B1 Page 1 of 1
DATED : April 13, 2004
INVENTOR(S) : Sheueling Chang It is certified that error appears in the above-identified patent and that said Letters Patent is hereby corrected as shown below:

Column 4,
Line 43, equation, "$s=x_p\ y_p/x_p$" should read -- $s=x_p+y_p/x_p$ --

Column 9,
Line 46, "of comprising:" should read -- comprising: --

Column 11,
Line 39, "and i if both register U's contents and register A's" should read -- and t if both register U's contents and register A's --

Signed and Sealed this

Twenty-first Day of December, 2004

JON W. DUDAS
*Director of the United States Patent and Trademark Office*